United States Patent [19]

Hartung et al.

[11] Patent Number: 5,651,122
[45] Date of Patent: Jul. 22, 1997

[54] PIPELINED DATA PROCESSOR THAT DETECTS AN ILLEGAL INSTRUCTION BY DETECTING LEGAL INSTRUCTION OPERATION CODES

[75] Inventors: Eytan Hartung; James G. Viot; Oded Yishay, all of Austin, Tex.

[73] Assignee: Motorola, Inc., Schaumburg, Ill.

[21] Appl. No.: 698,875

[22] Filed: May 13, 1991

[51] Int. Cl.[6] ........................................................ G06F 9/00
[52] U.S. Cl. ............................................................. 395/384
[58] Field of Search ............................................... 395/375

[56] References Cited

U.S. PATENT DOCUMENTS

| | | | |
|---|---|---|---|
| 3,675,214 | 7/1972 | Ellis et al. | 395/500 |
| 4,167,778 | 9/1979 | Sipple | 395/375 |
| 4,446,517 | 5/1984 | Katsura et al. | 395/375 |
| 4,466,055 | 8/1984 | Kinoshita et al. | 395/800 |
| 4,488,228 | 12/1984 | Crudele et al. | 395/575 |
| 4,710,866 | 12/1987 | Zolnowsky et al. | 395/375 |
| 4,864,535 | 9/1989 | Rogers et al. | 365/94 |
| 5,046,040 | 9/1991 | Miyoshi | 395/375 |

*Primary Examiner*—Richard L. Ellis

[57] ABSTRACT

A pipelined data processor (10) has a control unit (14') that detects an illegal instruction as well as legal instruction opcodes. An opcode decoder (28) decodes instructions. In response to decoding an illegal instruction, opcode decoder (28) provides no output signal. In response to decoding a legal instruction, opcode decoder (28) provides one of a plurality of output signals. A ROM (27) provides a first output in response to receiving no output from the decoder (28), and provides one of a plurality of second outputs in response to receiving one of a plurality of output signals from decoder (28). The first output of the ROM (27) is a first microword of a routine for processing the illegal instruction. Each of the second outputs of the ROM (27) is a first microword of a routine for processing the legal instruction received from the decoder (28).

3 Claims, 5 Drawing Sheets

PIPELINED DATA PROCESSOR THAT DETECTS AN ILLEGAL INSTRUCTION BY DETECTING LEGAL INSTRUCTION OPERATION CODES

FIELD OF THE INVENTION

This invention relates generally to data processing operations, and more particularly, to a pipelined data processing operation.

BACKGROUND OF THE INVENTION

Pipelined data processors are generally required to process exceptions as well as normal instructions. A known method of detecting exceptions during data processing is through the use of dedicated logic, such as a programmable logic array (PLA). For example, a common exception that is detected through the use of a PLA is an illegal operation code (opcode). The illegal opcode PLA receives and decodes the instruction opcode to determine whether a legal instruction opcode has been received. If the illegal opcode PLA determines that the instruction opcode is not a legal instruction opcode, the illegal opcode PLA provides information to an entry Read Only Memory (ROM) to process an illegal instruction operation. A problem with providing dedicated logic, such as an illegal opcode PLA, for the purpose of detecting a predetermined exception is the additional area required to implement the dedicated logic. In addition, a problem which may be associated with dedicated logic used to detect an exception is additional data processing time necessary for the illegal opcode PLA to detect an exception. The additional data processing time translates into degraded performance of a pipelined data processor. Therefore, it is preferred to detect exceptions associated with the instruction opcode within a pipelined data processor with a minimal increase in both logic and data processing time.

SUMMARY OF THE INVENTION

The previously mentioned needs are fulfilled with the present invention. In one form, there is provided a pipelined data processor that detects an illegal instruction by detecting legal instruction operation codes. An opcode decoding means has an input for receiving input opcodes. The opcode decoding means provides one of a predetermined plurality of output signals in response to receiving each of the predetermined legal instruction opcodes and does not providing a predetermined illegal output signal in response to detecting receipt of an illegal instruction opcode. A memory means is coupled to the opcode decoding means having a plurality of intersecting and electrically independent rows and columns of conductors. Each of predetermined columns is selectively coupled to a reference voltage terminal in response to a predetermined bit of the output signals. The memory means has an additional column conductor used exclusively for indicating the detection of receipt of the illegal instruction opcode by the opcode decoding means. The memory means is used to provide predetermined instruction microwords in response to receiving either legal or illegal instruction opcodes.

These and other features, and advantages, will be more clearly understood from the following detailed description taken in conjunction with the accompanying drawings.

DETAILED DESCRIPTION OF A PREFERRED EMBODIMENT

Figure 1:
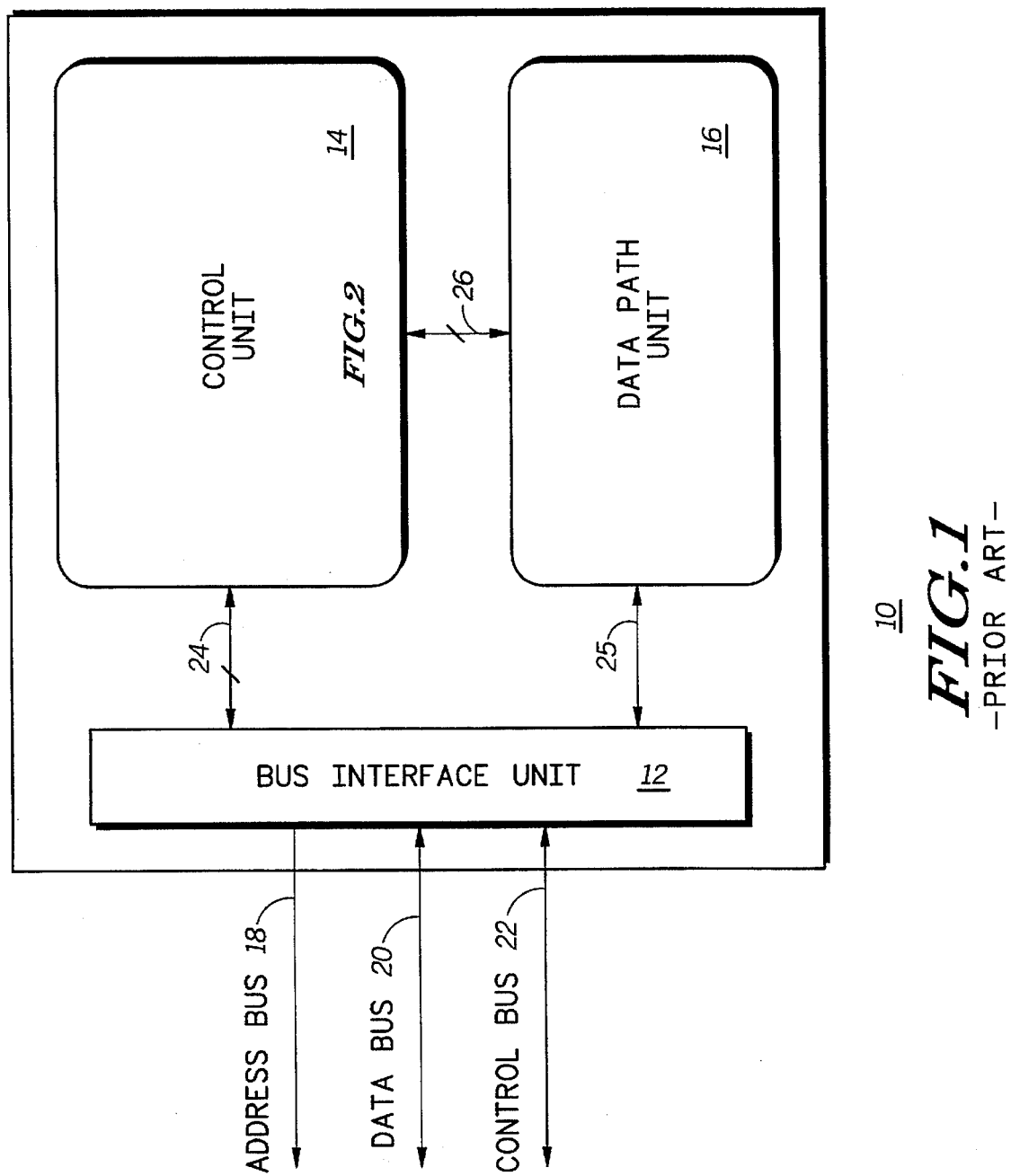
FIG. 1 illustrates in block diagram form a known pipelined data processing system.

FIG. 1 illustrates a known pipelined data processor 10 having a bus interface unit 12, a control unit 14, and a data path unit 16. Each of the above units represents a predetermined stage of the pipelined data processor. Bus interface unit 12 is connected to a source (not illustrated) external to pipelined data processor 10 via an address bus 18, a data bus 20, and a control bus 22. The bus interface unit 12 is connected to a control unit 14 via bus 24, and to a data path unit 16 via a bus 25. The control unit 14 is connected to the data path unit 16 via a bus 26. Data bus 20, control bus 22, and buses 24–26 are bidirectional busses.

Figure 2:
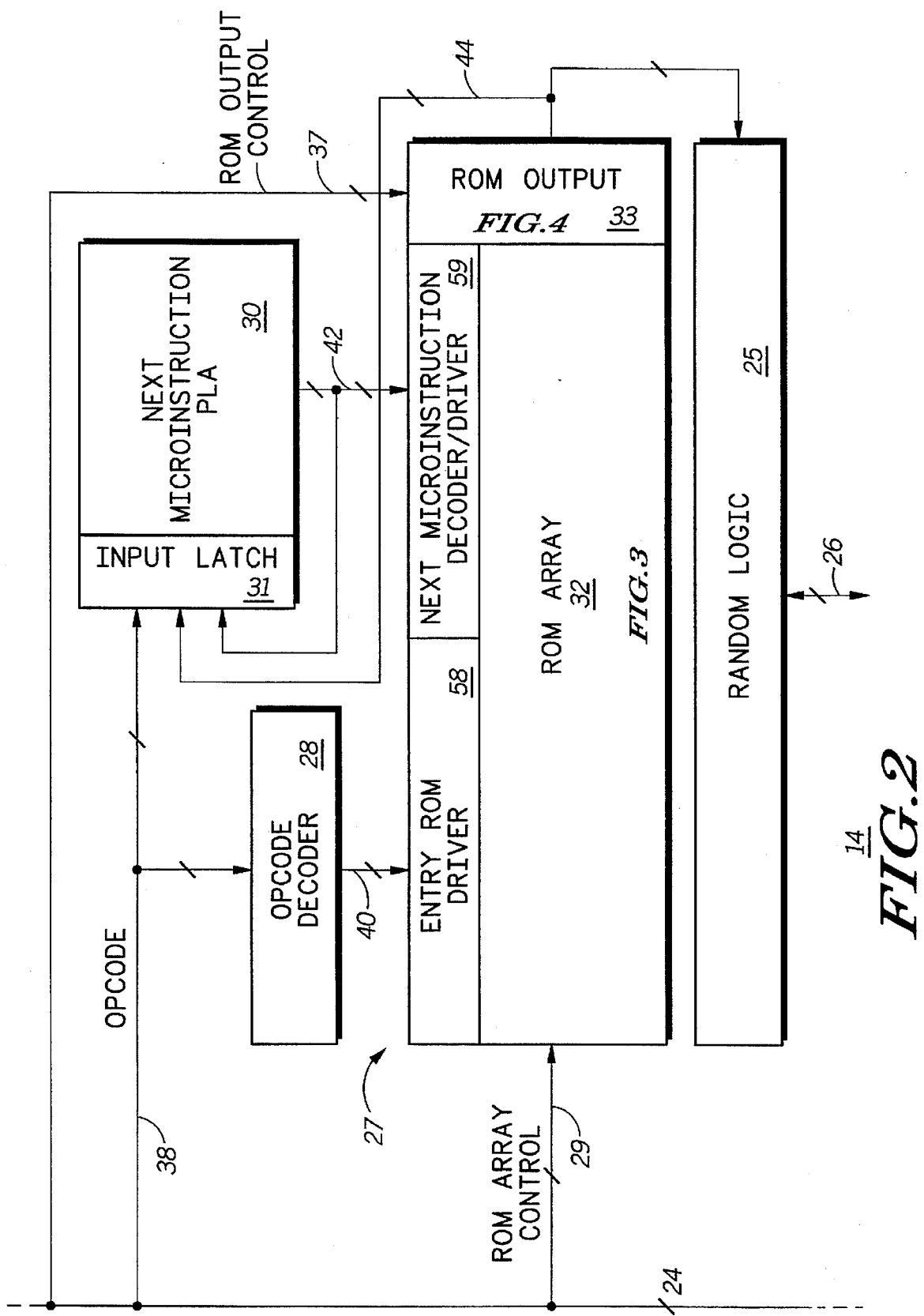
FIG. 2 illustrates in block diagram form a control unit according to an embodiment of the present invention which may be used in place of the control unit illustrated in the system of FIG. 1.

FIG. 2 illustrates, in accordance with the present invention, a control unit 14' which may be substituted in place of control unit 14 of FIG. 1. Control unit 14' has an opcode decoder 28, a next microinstruction programmable logic array (PLA) 30 with an input latch circuit 31, a read only memory (ROM) portion 27, and a random logic circuit 25. The ROM portion 27 has a ROM array 32, a ROM output circuit 33, an entry ROM driver circuit 58, and a next microinstruction decoder/driver circuit 59.

The opcode decoder 28 has an input connected to bus 24 via a bus 38 to receive and map opcode signals into ROM portion 27 by decoding the opcode signals. Opcode decoder 28 also has an output connected to an input of entry ROM driver circuit 58 via a bus 40. The next microinstruction PLA 30 receives input signals (not illustrated) from the input latch 31, and has a control output to provide controls signal via a bus 42. The input latch 31 has a first input connected to bus 24 via bus 38, a second input connected to bus 42, and a third input connected to an output of the ROM output circuit 33 via a bus 44. The ROM portion 27 has a control input connected to bus 24 via a bus 29 labeled "ROM array control." The next microinstruction decoder/driver circuit 59 is connected to the next microinstruction PLA 30 via bus 42. The ROM output circuit 33 has a control input connected to bus 24 via a bus 37 labeled "ROM output control." The ROM output circuit 33 is connected to random logic circuit 25 via bus 44. Random logic circuit 25 is connected to bidirectional control bus 26.

Figure 3:
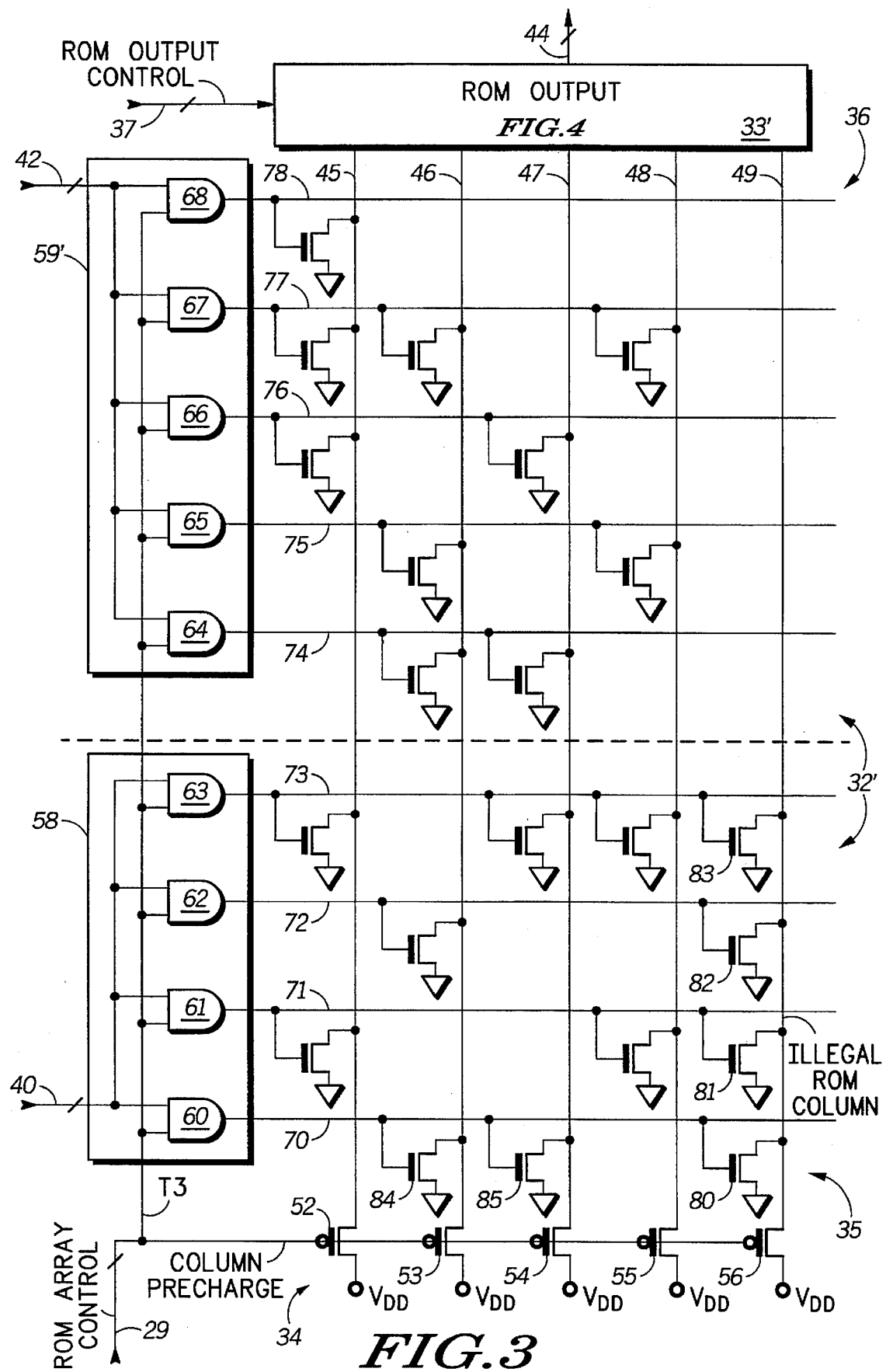
FIG. 3 illustrates in partial logic diagram form a ROM according to an embodiment of the present invention, of the control unit of FIG. 2.

FIG. 3 illustrates a portion of ROM portion 27 in more detail. In particular, a portion 32' of the ROM array 32 is illustrated. The ROM array portion 32' has an entry array portion 35 and a next microinstruction or next microinstruction array portion 36. The ROM portion 27 has a precharge circuit portion 34, entry ROM driver circuit 58, and a next microinstruction or next microinstruction driver circuit 59' which does not illustrate the decoder of decoder/driver circuit 59. ROM array portion 32' has a plurality of row lines, such as row lines 70–78. ROM array portion 32' also has a plurality of ROM column lines, such as ROM column lines 45–49, each of which is connected to a portion 33' of ROM output circuit 33. As illustrated, the column lines intersect with the row lines in an overlayed manner but do not electrically connect at the intersections.

Column line 49 is labeled "Illegal ROM Column." Each of the ROM column lines is connected to a predetermined one of the inputs of a portion 33' of the ROM output circuit 33. The precharge circuit portion 34 has a plurality of P-channel transistor switches 52–56. Each of the P-channel transistor switches 52–56 has a gate connected to a signal labeled "Column Precharge." The Column Precharge signal is a conductor within the ROM array control bus 29 of FIG. 2. Each of the P-channel transistor switches 52–56 has a source connected to a positive power supply terminal labeled "$V_{DD}$." Further, each of the P-channel transistor switches 52–56 has a drain respectively connected to ROM column lines 45–49. The entry ROM driver circuit 58 has a plurality of row driver circuits 60–63, and the next microinstruction driver circuit 59' has a plurality of row driver circuits 64–68. Each of the row driver circuits 60–63 has a control input connected to a predetermined control signal within bus 40. Each of the row driver circuits 64–68 has a control input connected to a predetermined control signal within bus 42. Each of the row driver circuits 60–68 has a clock input connected to a timing signal T3 which is contained within ROM array control bus 29. Each of the row driver circuits 60–68 has an output connected to a predetermined row line. For example, within ROM array portion 32' the output of row drivers 60–68 are respectively connected to row lines 70–78. ROM array portion 32' contains a plurality of N-channel transistor switches. Each N-channel transistor switch is located at a predetermined intersection of a row and a column within ROM array 32. Each N-channel transistor has a source connected to a reference supply labeled "Vss." Each N-channel transistor has a gate connected to a predetermined row line, and each N-channel transistor has a drain connected to a predetermined column line. For example, N-channel transistors 80–83 each has a drain connected to column line 49, and each has a gate respectively connected to row lines 70–73. Each row line within the entry ROM array portion 35 is connected to the gate of a separate N-channel transistor whose drain is connected to column line 49. Further, within the next microinstruction array portion 36 there are no N-channel transistors connected to column line 49.

Figure 4:
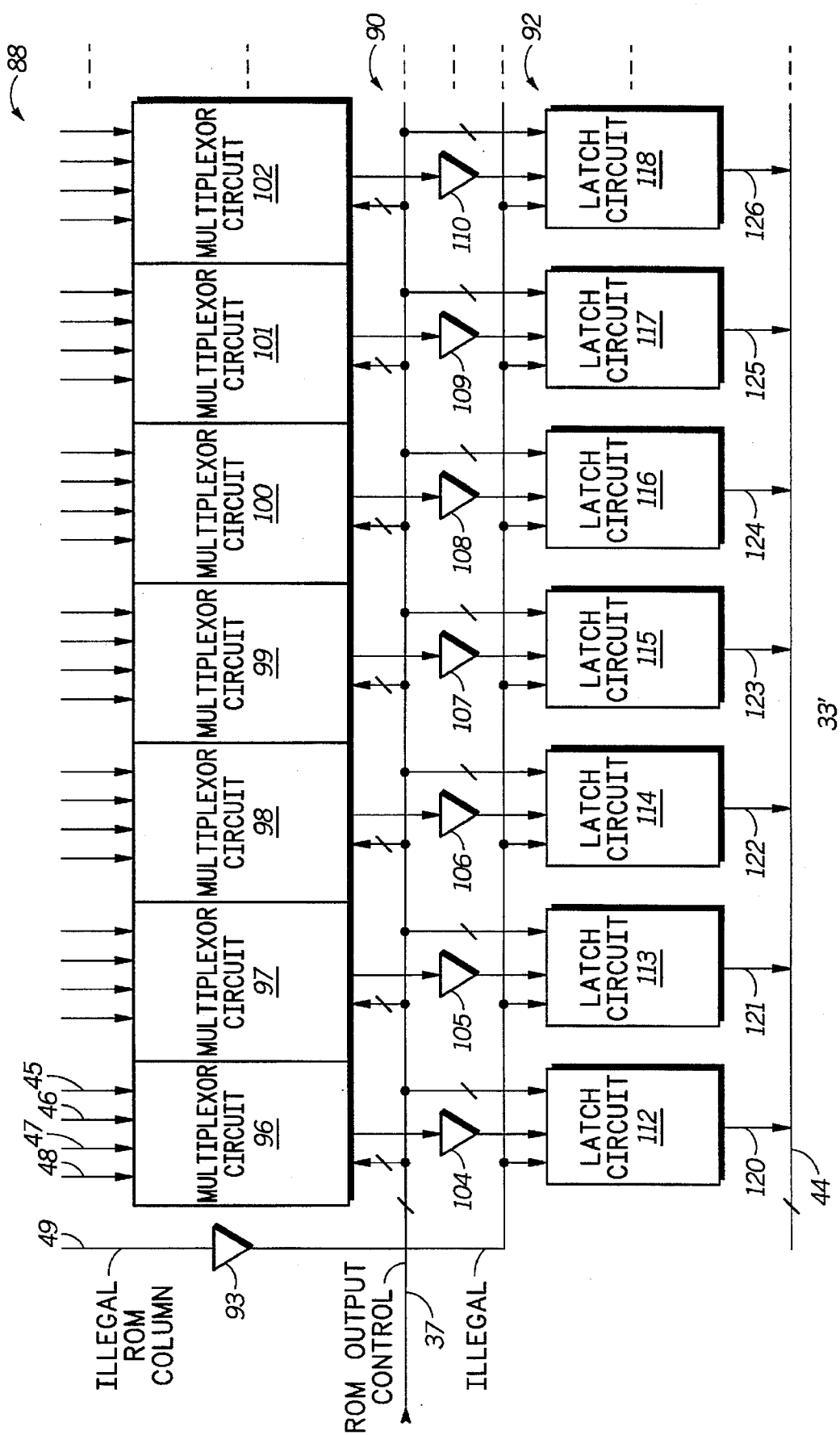
FIG. 4 illustrates in block diagram form a ROM output circuit according to an embodiment of the present invention, of the control unit of FIG. 2.

FIG. 4 illustrates in further detail the portion 33' of the ROM output circuit 33. The ROM output circuit portion 33' has a multiplexor portion 88, an amplifier portion 90, a latch portion 92, and an illegal ROM column amplifier 93. The multiplexor portion 88 contains a plurality of multiplexor circuits, such as multiplexor latch portion 92 contains a plurality of latch storage circuits, such circuits 96–102. The amplifier portion 90 contains a plurality of amplifier circuits, such as amplifier circuits 104–110, which each amplify an output of a predetermined multiplexor circuit. The latch portion 92 contains a pluraliy of latch storage circuits, such as latch circuits 112–118. Each of latch circuits 112–118 has a first control input for receiving the ROM output control signal and a second control input for receiving a signal labeled "Illegal." Each multiplexor circuit within multiplexor circuit portion 88 has a plurality of data inputs which are each connected to a predetermined one of the ROM column lines within ROM array 32. In the preferred embodiment, each of the multiplexor circuits, within multiplexor circuit portion 88, has four data inputs. Further, each of the multiplexor circuits has a control input connected to a predetermined control signal from the ROM output control bus 37. Each of the multiplexor circuits, within multiplexor circuit portion 88, has a data output connected to an input of a predetermined one of the amplifier circuits within amplifier circuit portion 90. The illegal ROM column amplifier 93 has an input connected to the illegal ROM column line 49, and has an output signal which provides the Illegal signal. The Illegal signal is connected to an input of each of the latch circuits within latch circuit portion 92. Each latch circuit has a data input connected to an output of a predetermined one of the amplifiers within amplifier portion 90. Each latch circuit has a control input connected to a predetermined control signal from the ROM output control bus 37. Further, each of the latch circuits has a data output connected to a separate conductor within bus 44.

Figure 5:
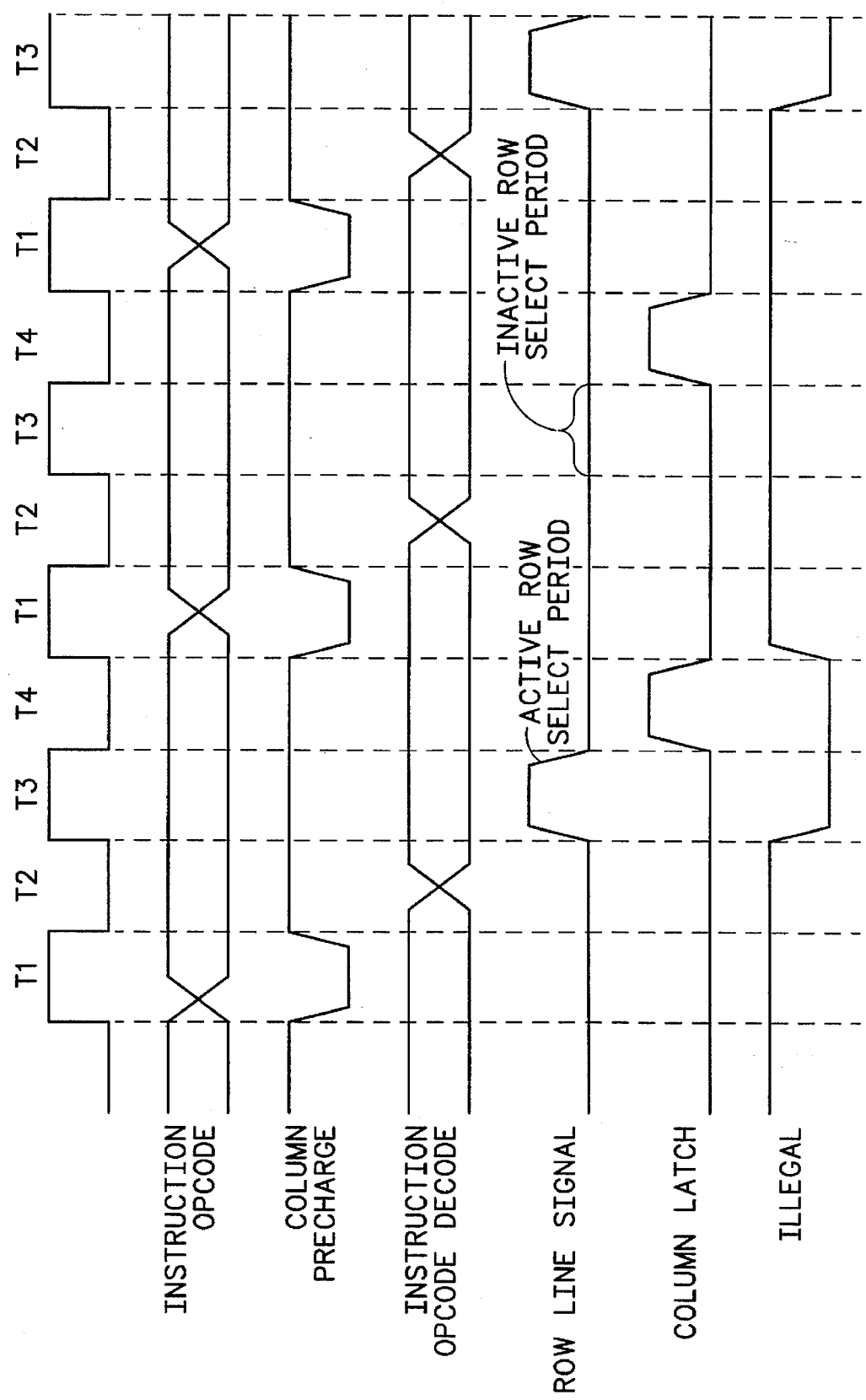
FIG. 5 illustrates in timing diagram form a timing diagram illustrating the operation of the control unit of FIG. 2 according to an embodiment of the prsent invention.

FIG. 5 illustrates a timing diagram for an operation of the control unit 14' of FIG. 2. The timing diagram illustrates clocks T1–T4, an instruction opcode timing, a column line precharge signal, an opcode decode period, a row line signal period, a column latch period, and timing associated with an illegal signal. In the illustrated form, the column precharge signal is an active low signal.

In operation, the pipelined data processor 10 of FIG. 1 provides address and control information via the address bus 18 and control bus 22, respectively, to a source (not illustrated) external to the pipelined data processor 10. In response to the address and control information, the source (not illustrated) provides data to the pipelined data processor via the data bus 20. The received data information will be either an instruction opcode or a data operand. The bus interface unit 12 receives the data from data bus 20 and transfers the data to either control unit 14 or data path unit 16, depending on whether the data is an instruction opcode or a data operand. While the control unit 14 and the data path unit 16 are processing data received from the bus interface unit 12, the bus interface unit 12 provides additional address and control information to the source (not illustrated) for the purpose of receiving additional data processing information. When the pipelined data processor 10 provides address and control information to the source (not illustrated) for the purpose of receiving either an instruction opcode or a data operand, the pipelined data processor is said to be "fetching." When the pipelined data processor 10 is fetching while the control unit 14 and data path unit 16 are processing data, the pipelined data processor is said to be "pipelined." That is, while a data processing instruction is being processed by the control unit 14 and the data path unit 16, a next instruction opcode is being fetched by the bus interface unit 12.

In accordance with the present invention, once the bus interface unit 12 fetches an instruction opcode, the bus interface unit 12 transfers the instruction opcode to the control unit 14' via bus 24. The opcode decoder 28 of FIG. 2 receives the instruction opcode via bus 38 and provides an active output signal via bus 40 to the entry ROM driver circuit 58 for each legal instruction opcode. If the instruction opcode is not legal, there is no active output signal generated from opcode decoder 28.

Referring to FIG. 3, each of the row drivers 60–68 performs a decoding operation by implementing a logical ANDing function as well as performing a driver function. That is, in response to an active output signal received via bus 40 or bus 42, the output of a predetermined row driver is selectively activated during a T3 time period. For example, FIG. 5 illustrates both an instruction opcode and the column precharge signal becoming active during a T1 time period. The active column precharge signal causes each of the P-channel transistors within ROM precharge portion 34 of FIG. 3 to drive each column line to a precharged state. The precharged state represents a predetermined first logic state, and a discharged state represents a predetermined second logic state. In the preferred embodiment, the first logic state is at the voltage level $V_{DD}$ and the second logic state is at the reference voltage level $V_{SS}$. During the T2 time period the opcode decoder 28 of FIG. 2 decodes the received instruction opcode and provides an active output signal to a predetermined one of the row drivers within the entry ROM driver circuit 58. In response to the active output signal from the opcode decoder 28 and an active T3 signal, a predetermined one of the row line signals within the entry ROM array portion 35 is activated. The activated row line signal is illustrated in FIG. 5 as an active row select pulse on the row line signal. The activated row line signal within the entry ROM array portion 35 causes predetermined columns within ROM array 32 to be discharged. Further, since each of the row line signals within entry ROM array 35 is connected to the gate of an N-channel transistor whose drain is connected to column line 49, column line 49 is discharged whenever a row select signal within the entry ROM array portion 35 is activated. The ROM output circuit 33 interprets the discharged column line 49 as meaning a legal instruction was received and decoded by the opcode decoder 28 of FIG. 2.

In response to control signals received via the ROM output control bus 37, each multiplexor circuit within multiplexor portion 88 of FIG. 4 selectively couples a predetermined one of the data input signals to the data input of a predetermined amplifier circuit within amplifier portion 90. The control signals are provided by the bus interface unit 12 in response to receiving control information from control bus 22. Each latch circuit within latch portion 92 latches the data output received from a predetermined amplifier circuit in response to a column latch signal received from ROM output control bus 37 assuming that the Illegal signal is not asserted. The latched data output of each latch circuit is connected to bus 44. Collectively, the data output of latch portion 92 is a digitally encoded bit pattern called a "microword" which is used to execute a data processing instruction. Each data processing instruction has a predetermined number of execution steps, and each execution step requires a different microword. As discussed further below, if the Illegal signal is asserted, each latch circuit within latch portion 92 outputs a predetermined output microword rather than latching the data outputs of amplifier circuits 112–118. This feature minimizes potential processing delays typically associated with the receipt of illegal instructions.

Referring to FIG. 2, random logic circuit 25 provides control information via bus 26 to the data path unit 16 of FIG. 1 to control data processing in response to control information received from ROM output circuit 33 via bus 44. In response to data received at the inputs to input latch 31 of FIG. 2, the next microinstruction PLA 30 provides data for the next microinstruction decoder/driver circuit 59 and the input latch 31 via bus 42. The data received from bus 42 by the next microinstruction decoder/driver circuit 59 causes a predetermined one of the row lines within the next microinstruction ROM array portion 36 to be selectively activated. In response to the selectively activated row line, a predetermined number of ROM column lines within ROM array 32 is discharged. Since there are no N-channel transistors connected to the illegal column line within the next microinstruction array portion 36, the illegal column line is never discharged by an activated output of the next microinstruction decoder/driver circuit 59. However, since predetermined ROM columns are discharged as a result of activated outputs from the next microinstruction decoder/driver circuit 59, a microword is latched at latch portion 92 independent of the logic state of the illegal signal.

As mentioned previously, if the instruction opcode received by the opcode decoder 28 is not a legal opcode instruction, each output of the opcode decoder 28 remains inactive. Since each output of the opcode decoder 28 is inactive, each of the row lines within the entry ROM array portion 35 remains inactive. The inactive row line signal is illustrated in the timing diagram of FIG. 5 as the inactive row select period. Further, since each row line remains inactive, each of the column lines within ROM array 32 remains precharged, including the illegal column line 49. The precharged illegal ROM column line 49 causes the illegal signal to be activated. In response to the activated illegal signal, each latch circuit within latch portion 92 is set to a predetermined logic state, regardless of the data received at the data input of each latch circuit. Collectively, the predetermined logic state at the output of the latch portion 92 represents a first microword for an illegal instruction. The illegal instruction signal is connected from the ROM output 33 to the input latch 31 via bus 44 and latched. Next microinstruction PLA 30 uses the illegal instruction signal in addition to the opcode received via bus 38 as a first microword in an illegal instruction execution. The next microinstruction PLA 30 provides an address via bus to the next microinstruction decoder/driver which is the address in ROM array 32 of a second microword to be executed in connection with illegal instruction. Other addresses for subsequent microwords associated with the illegal instruction are provided by the next microinstruction PLA 30 to decoder/driver 59. The microwords associated with the illegal instruction are also output via bus 44 to random logic 25 for use by data path unit 16 and the bus interface unit 12.

To summarize, the present invention may be used in a conventional pipelined data processor architecture such as shown in FIG. 1 or in a variety of modified architectures. In the system of FIG. 1, data processor 10 fetches both instruction and operand data from a source (not illustrated) external to the pipelined data processor 10. An opcode decoder 28 fully decodes the instruction opcodes and provides an active output signal in response to each legal instruction opcode. If the opcode decoder 28 does not decode a legal instruction, each output of the opcode decoder 28 remains inactive. Each output of the opcode decoder 28 is coupled to a predetermined one of the row line signals within the entry ROM array portion 35. An active output signal from the opcode decoder 28 causes a predetermined number of ROM column lines within ROM array 32 to be discharged. In response to predetermined control signals, the logic state of each of predetermined column lines is coupled to the data input of a predetermined latch circuit within latch portion 92. In response to a separate control signal, the logic state of each of the coupled column lines is latched at the output of latch portion 92. Collectively, the latched output of latch portion 92 represents a microword. Subsequent microwords required for processing the received instruction opcode are generated, in part, with the utilization of the next microinstruction PLA 30 and the next microinstruction ROM array portion 36. If the opcode decoder 28 receives an instruction opcode that is not legal, all of the ROM column lines within ROM array 32 remain precharged, including the illegal ROM column line 49. The precharged illegal ROM column line 49 causes the illegal signal to set the output of each latch circuit within latch potion 92 to a predetermined logic state. The predetermined logic state at the output of the latch portion 92 represents the first microword for the illegal instruction. The illegal instruction signal is connected to the next microinstruction PLA 30 to generate a second microinstruction.

It should be well understood that a pipelined data processor having an opcode decoder 28 provides a predetermined output logic state for a detected illegal instruction and a legal instruction opcode in an identical amount of time. It should be well understood that even though the detection of illegal instructions is emphasized herein, the present invention may be utilized to detect any type of special purpose instruction, such as an exception.

Further, the predetermined logic state is provided using a minimum of logic circuitry. Since the circuitry required to implement the detection of the illegal instruction is contained within opcode decoder 28 and ROM 27 which are used for legal instruction processing, a substantial reduction in area for implementation is achieved.

While there have been described herein the principles of the invention, it is to be clearly understood to those skilled in the art that this description is made only by way of example and not as a limitation to the scope of the invention. For example, it should also be apparent that although specific N- channel and P-channel MOS transistors are illustrated, the present invention may be implemented with other types of transistors and transistors having other conductivities. Although a precharge level of $V_{DD}$ is utilized in the preferred embodiment, other precharge voltage levels are common. Further, although the ROM columns utilize a precharge discharge detection scheme, a sense amplifier such as a current feedback sense amplifier may be used.

Accordingly, it is intended, by the appended claims, to cover all modifications of the invention which fall within the true spirit and scope of the invention.

We claim:

1. A microprogrammed data processor having illegal opcode detection logic, comprising:

a microprogram memory, the microprogram memory further comprising:

a first predetermined number of row conductors;

a second predetermined number of column conductors;

a third predetermined number of transistors, each of the third predetermined number of transistors located at an intersection of one of the first predetermined number of row conductors and one of the second predetermined number of column conductors and has a gate terminal connected only to said one of the first predetermined number of row conductors, a first current terminal connected to said one of the second predetermined number of column conductors and a second current terminal connected to a first reference voltage source; and a fourth predetermined number of transistors, each of the fourth predetermined number of transistors located at an intersection of one of the first predetermined number of row conductors and a particular one of the second predetermined number of column conductors such that every intersection between the particular one of the second predetermined number of column conductors and any of the first predetermined number of row conductors is a location of one of the fourth predetermined number of transistors, each of the fourth predetermined number of transistors has a gate terminal connected only to said one of the first predetermined number of row conductors, a first current terminal connected to said particular one of the second predetermined number of column electrodes and a second current terminal connected to said first reference voltage source; and instruction decoder means having input means for receiving an instruction and a first predetermined number of output lines, each one of the first predetermined number of instruction decoder output lines coupled to exactly one of the first predetermined number of row conductors of the microprogram memory, the instruction decoder means for providing an active signal on exactly one of the first predetermined number of output lines when the instruction received by the input means is a legal instruction and for providing no active signal on any of the first predetermined number of output lines when the instruction received by the input means is not a legal instruction.

2. A microprogrammed data processor according to claim 1 wherein the microprogram memory further comprises:

precharge means coupled to each of the second predetermined number of column conductors for temporarily coupling each of the second predetermined number of column conductors to a second reference voltage source.

3. A microprogrammed data processor according to claim 2 further comprising:

output means having a first plurality of inputs coupled to all but said particular one of the second predetermined number of column conductors and having a control input coupled to said particular one of the second predetermined number of column conductors, the output means also has an output, the output means for providing, under control of a signal received at the control input, either an output signal that corresponds to signals received at the first plurality of inputs or a predetermined output signal unrelated to signals received at the first plurality of inputs.

* * * * *